Figure 1:
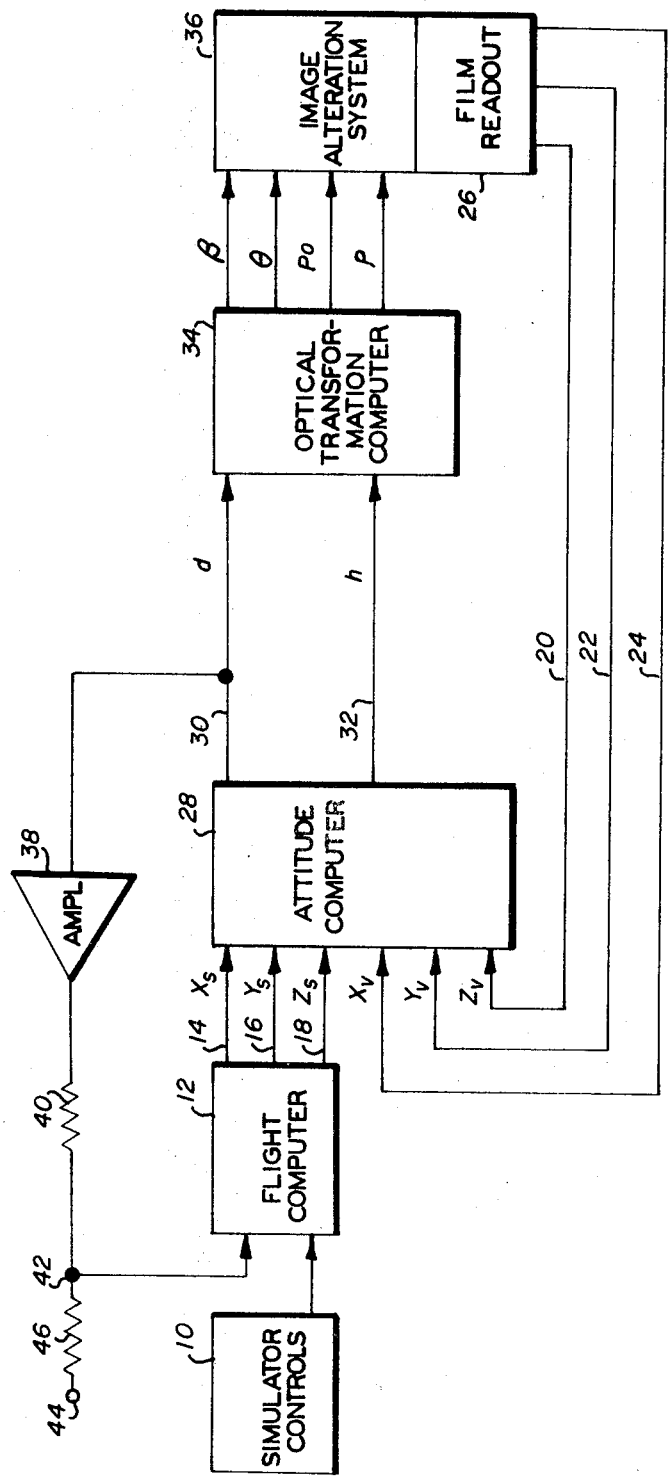

United States Patent

[11] 3,591,933

| | | |
|---|---|---|
| [72] | Inventor | William C. Ebeling<br>Binghamton, N.Y. |
| [21] | Appl. No. | 784,041 |
| [22] | Filed | Dec. 16, 1968 |
| [45] | Patented | July 13, 1971 |
| [73] | Assignee | Singer-General Precision, Inc.<br>Binghamton, N.Y. |

[54] VISUAL SYSTEM COMPUTER
7 Claims, 2 Drawing Figs.

[52] U.S. Cl. ............................................... 35/12
[51] Int. Cl. .............................................. G09b 9/08,
B64g 7/00
[50] Field of Search ..................................... 35/12

[56] References Cited
UNITED STATES PATENTS
| | | | |
|---|---|---|---|
| 1,829,634 | 10/1931 | Chretien ................... | 352/239 |
| 3,081,557 | 3/1963 | Mailhot ..................... | 35/12 |
| 3,261,912 | 7/1966 | Hemstreet .................. | 35/12 X |

*Primary Examiner*—Robert W. Michell
*Assistant Examiner*—L. R. Oremland
*Attorneys*—Francis L. Masselle, William Grobman and Charles S. McGuire ABSTRACT: The disclosed embodiment of the present invention is intended to be employed with a flight simulator and the like which utilizes a visual system having a defined envelope, such as a motion picture system with distortion optics to provide translational visual excursions from the imagery of the photographed scenes and an apparent change in prospective of the projected image. The invention is a method of and means for eliminating a cumulative position error derived from the computed position of the flight simulator with respect to the position of the filmed flight path, such that the translational limits of the visual system will not be exceeded. The computed position of the flight simulator is derived from manipulation of the controls by an operator of the simulator. Generally, a quantity proportional to computed lateral position of the simulator from the filmed flight path is employed as an imperceptible "washout" term in the control of the visual system that will tend to neutralize the cumulative position error.

PATENTED JUL 13 1971

3,591,933

INVENTOR.
WILLIAM C. EBELING
BY

HIS ATTORNEY

VISUAL SYSTEM COMPUTER

This invention relates generally to a visual system computer and more particularly to a method of and means for eliminating a cumulative position error of a simulator with respect to the recorded position of The filmed flight path displayed by the simulator visual system.

Visual systems are employed with vehicle simulators to present to the operator of the simulator various scenes which would be viewed along a typical vehicular path which is to be visually simulated. A well-known and accepted visual system is one which employs a motion picture containing scenes taken from a vehicle following a typical path, such as an airplane following a well defined approach path to a landing strip. The recorded scenes from the motion picture frames are distorted by the optics of the visual system in accordance with the simulated excursions of the simulator from the actual viewpoint of the recorded scenes. Such an optical system for altering the apparent perspective of an image is disclosed in U.S. Pat. No. 3,015,988.

The visual system disclosed in that patent alters the apparent perspective of an image by performing two primitive transformations by means of two anamorphic lenses having their axis of magnification rotatable with respect to one another, a zoom lens which compensates for the magnification of the image by the anamorphic lenses, and an image rotator for correcting the rotation of the image produced by the anamorphic lenses. This type of perspective alteration optical system can produce an apparent change in the perspective of an image within prescribed limits.

More particularly, the visual system disclosed in the prior-mentioned patent and other simulator visual systems preferably employ a motion picture projector which displays scenes recorded on a motion picture film through distortion optics onto a screen. If the optical information which is projected from a particular recorded scene is distorted in a prescribed fashion, a change in the apparent perspective of the image is realized. For example, if the image is stretched vertically while maintaining a constant window area for viewing by an operator, the visual impression realized by the operator will be that of a vertical excursion with respect to the recorded scene. On the other hand, if the picture is sheared while maintaining the horizon fixed and the window area constant, the visual impression realized by the operator will be that of a horizontal excursion with respect to the recorded scene. It is to be understood, of course, that the window area through which the image on the screen is viewed by the operator is smaller than the projected image so that the stretched and sheared edges of the image will not be viewed by the operator. It can be readily appreciated that an excursion having both vertical and horizontal components can be simulated by simultaneous distortions on both directions.

The amount of permissible vertical stretching, thus vertical excursion, is defined or limited in the above-described visual system by the total maximum magnification of both anamorphic lenses. This total magnification also determines the amount of the shear which can be produced by the system. For example, if each anamorphic lens has a power of two and the zoom lens has a power of four, the apparent viewpoint of an operator can be increased to an altitude of four times the altitude of the original viewpoint, which is the point at which the scene was originally recorded, and decreased to an altitude of one-fourth the altitude of the original viewpoint. In addition, the total permissible horizontal displacement is approximately equal to 3¾ the altitude of the original viewpoint. The limits of the possible visual excursions permissible with such a system, therefore, is a circle in the plane of the recorded scene having a diameter equal to 3¾ the altitude of the original viewpoint and having the lowest point thereof, which is the limit of the vertical excursion toward the earth, spaced a distance of one-fourth the altitude of the original viewpoint above the surface of the earth. Therefore, if a particular flight mission is recorded at an altitude of 500 ft. such as may be required of a military mission, the permissible lateral displacement or visual excursion at the altitude of the original viewpoint is only 1,500 ft., and the maximum permissible lateral displacement, which is at an altitude of 2⅛ the altitude of the original viewpoint, which is equal to 1,062.5 ft., is 1,875 ft. Consequently, if the student pilot is controlling the simulator to simulate a flight path at the altitude of the original viewpoint, the maximum permissible lateral excursion to either side thereof is only 750 ft.

In the above-described visual system, the controlled picture distortion is applied as a direct function of the difference between the simulated airplane position and the position of the original flight path of the camera aircraft. If such a visual system is employed for relatively long corridor missions, slight departures from the prescribed flight path and the corrections made thereto by the student pilot would result in a cumulative position error that would cause the visual system to exceed its transitional limits. That is, if a relatively long flight path is to be simulated (in the order of 100 miles), slight correction made by the student pilot would cause the simulated airplane to gradually drift away from the position of the recorded flight path, the data for which is stored on the film sound track. As a result, the visual system computer would call for the visual system to exceed its transitional limits resulting in a substantial reduction in system utility. It can be readily appreciated that such position errors can present a serious problem to the successful training of a student pilot, particularly of a military aircraft which is capable of maneuvering through such a lateral displacement as 750 ft. within a relatively short time period. Since many military missions are executed over terrain which does not include any cultural objects for providing a reference to the student pilot, it is quite possible that a position error can accumulate to cause the limits of the visual system to be exceeded. If the limits of a visual system are exceeded, either the student pilot will observe the edges of the image within the window or some means must be provided, such as simulated fog, which will obscure the image at or near those limits.

Accordingly, the present invention overcomes the above-described problem by employing an imperceptible "washout" term in the control of the visual system that will tend to neutralize the cumulative position error. An object of the present invention, therefore, is to provide a visual system computer which eliminates the cumulative position error which may be encountered in long corridor missions.

In order to control the distortion in the above-described visual system, a flight computer responsive to the simulator controls is employed. Outputs of the simulator controls which correspond to forces acting on the airplane are doubly integrated to provide signals corresponding to the computed position of the simulator along three orthogonal axis. Information pertinent to the position of each recorded scene on the film is recorded on a film sound track. The computed position of the simulator and the position of the recorded scenes are compared with one another to provide signals for controlling the picture distortion produced by the visual system. Additional inputs can be supplied to the flight simulator which correspond to such factors as, for example, the force of a wind on the aircraft.

A feature of the present invention resides in the provision of the development of a signal which corresponds to a force on the simulator, such as a force corresponding to a component of wind on the aircraft, which signal is proportional to the computed displacement of the simulator from the recorded flight path. This force signal can be supplied to the flight computer as an imperceptible "washout" term to neutralize any cumulative position error and reduce the possibility of causing the visual system limits to be exceeded.

Figure 2:
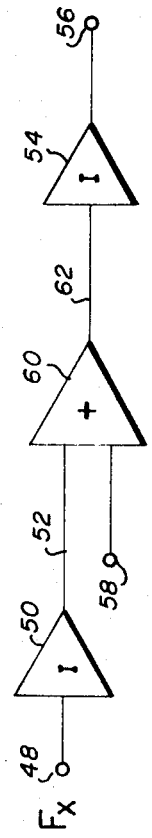

These and other objects, features and advantages of the present invention will be more fully realized and understood from the following detailed description when taken in conjunction with the accompanying drawing wherein:

FIG. 1 is a block diagram of a visual system computer which employs the principles of the present invention; and FIG. 2 is a block diagram useful in understaNding the operation of the flight computer illustrated in FIG. 1.

With reference to FIG. 1 in detail, there is shown a visual system computer responsive to controls of a vehicle simulator for controlling the distortion of images displayed to a student pilot and which employs the principles of the present invention. As shown therein, signals which are indicative of forces developed by manipulation of the simulator controls, represented by the block designated with the reference numeral 10, are supplied to a flight computer 12 which continually computes the simulated position along three orthogonal axis. The simulator controls 10 and flight computer 12 may consist of any of the known transducer and computer configurations which are responsive to the manipulation of the controls of a simulator to provide output signals corresponding to the simulator position along three orthogonal coordinate axis. An example of such an arrangement is disclosed by U.S. Pat. No. 2,925,667.

Since the signals supplied from the simulator controls 10 to the flight computer 12 correspond to the forces which would be developed on an aircraft in response to the manipulation of the controls thereof, the flight computer 12 performs a double integration of such force signals to develop signals corresponding to the computed position of the simulator. Consequently, the signals developed on output lines 14, 16 and 18 correspond to the computed position of the simulator along each of three orthogonal coordinate axis in space.

When the film which is to be used in the visual system is exposed to record successive scenes along a typical vehicular path, positional information is recorded on a sound track of the film which corresponds to the position of the camera exposing the film. During subsequent display of the scenes recorded on the film, such information is sensed and corresponding signals are developed by a film readout 26 on lines 20, 22 and 24. The signals on lines 20, 22 and 24, therefore, correspond to the position of the perspective point of each recorded scene along the three orthogonal coordinate axis.

The signals containing positional information of the simulator on the lines 14, 16 and 18 and the signals containing positional information of the perspective point of the recorded scenes on the lines 20, 22 and 24 are supplied to an attitude computer 28. A signal is developed on an output line 30 from the attitude computer 28 which corresponds to the lateral or horizontal displacement of the computed position of the simulator from the perspective point of the particular scene recorded on the film. Another signal is developed on an output line 32 from the attitude computer 28 which corresponds to the vertical displacement of the computed position of the simulator from the position of the perspective point of the scene recorded on the film.

The signals on lines 30 and 32 are supplied to an optical transformation computer 34 which develops drive signals for the distortion optics contained in an image alteration system 36. The transformation performed by optical transformation computer 34 is described in U.S. Pat. No. 3,015,988.

The computed position of the simulator is a function of the apparent forces applied thereto by manipulation of the controls. The first integral of such forces is equal to velocity. Therefore, the computed position of the simulator can be defined as a function of the computed ground speed and ground track angle as:

$$x, y = f(Vg, \psi g); \quad (1)$$

where, $x, y$ represents the computed position of the simulator along two coordinate axis.

$Vg$ is the computed ground speed of the simulator.

$\psi g$ is the computed ground track angle of the simulator.

The lateral displacement of the computed position of the simulator from the photographed flight path is employed to define a quantity which is added to the flight computer. This quantity is generated by supplying the signal on the line 30 corresponding to the lateral displacement of the computed position of the simulator from the photographed flight path to an amplifier 38. The signal developed by the amplifier 38 is supplied through a resistor 40 to a summing junction 42 connected to an input of the flight computer 12. The added quantity can be defined as:

$$f, (d) = \Delta Vg, \Delta \psi g; \quad (2)$$

where, $d$ is the lateral displacement of the computed position of the simulator from the photographed flight path.

Since the quantity added to the flight computer 12 from the controls 10 is a function of the computed ground speed of the simulator, $Vg$, and the computed ground track angle of the simulator, $\psi g$, the combined input to the computer 12 can be defined by:

$$Fx, y = f_2(Vg, \psi g) + f_2(\alpha Vg, \alpha \psi g): \quad (3)$$

where $Fx, y$ represents the total forces apparently acting on the simulator. Therefore, the new computed position of the simulator can be defined as:

$$X, Y = f(Vg, \psi g) + f(\alpha Vg, \alpha \psi g); \quad (4)$$

where, $X, Y$ represents the new computed position of the simulator.

The quantity added to the flight computer 12 from the amplifier 38 can correspond to either a force or a velocity component. Other quantities can also be added which have corresponding properties. For example, a quantity corresponding to a velocity produced by a component of wind can be added. Such a quantity is added to the input of the flight computer 12 from a terminal 44 which is connected to the summing junction 42 through a resistor 46. Consequently, the added component supplied to the flight computer 12 from the amplifier 38 would have the effect of a component of wind reacting on the aircraft. Since a small component of wind applied to an aircraft is not detectable over a short period of time, the quantity added by the amplifier 38 would also be undetectable over a short period of time. Since the quantity added by the amplifier 38 to the computer 12 tends to negate a positional error (as opposed to the effect of a component of wind), the student pilot will not detect any change regardless of the elapsed time.

FIG. 2 illustrates a block diagram which is useful in understanding the computation performed by the flight computer 12. Signals corresponding to forces acting on the aircraft are applied to a terminal 48 which is connected to an integrator 50. An output of the integrator 50 developed on a line 52 corresponds to the instantaneous velocity of the aircraft produced by the forces acting thereon. A second integrator 54 further integrates the signals corresponding to velocity to produce signals corresponding to the instantaneous position. The positional signals are developed on a terminal 56 which corresponds to one of the outputs 14, 16 or 18 of the flight computer 12.

If the quantity supplied to the flight computer 12 from the amplifier 38 corresponds to a force, it will be added by means of a summing junction with the signals from the controls 10 to the terminal 48. However, if the quantity supplied to the flight computer 12 from the amplifier 38 corresponds to velocity, it will be added to a terminal 58 which is connected to one input of a summing amplifier 60 having another input connected to the line 52. An output of the amplifier 60 developed on a line 62 constitutes a summation of all of the instantaneous velocity vectors of the aircraft. Such quantities are then integrated by the integrator 54 and supplied as an output corresponding to instantaneous position at the terminal 56.

In practice, the separate computers indicated by blocks 12, 28 and 34 will often be combined in a single simulator computer containing a math model which will provide the outputs shown as coming from the optical transformation computer 34. It can be readily appreciated that the implementation of the present invention may be contained within this math model for the drive equations for the image alteration system 36. An additional term is added to the normal computation, which is a function of ground speed and ground track angle of the simulator. If this additional function is defined to be imperceptibly small, the simulator computer will integrate this additional term to a resultant position which approaches the camera flight path. In operation, this added term will not be detectable by the student pilot if the correction is sufficiently small, since in actual flight, minor errors of this type can easily be caused by minor errors in wind computation and the like. Thus, although the instantaneous position of the simulated aircraft will not be the true integral of the ground path velocity vector, the error will not be detectable and the visual system will be able to operate more effectively by avoiding frequent excess limit excursions.

The principles of the invention explained in connection with the specific exemplification thereof will suggest many other applications and modifications of the same. It is accordingly desired that, in construing the breadth of the appended claims they shall not be limited to details shown and described in connection with the exemplification thereof.

I claim:

1. A control system for a vehicle simulator visual system including means for integrating signals generated by actuation of the controls of the vehicle simulator to derive first output signals commensurate with the simulated position along three coordinate axes, storage the specific for storing the position along the three coordinate axes of the perspective point of recorded pictorial information displayed by the visual system, means for comparing outputs of said storage means with corresponding ones of said first output signals to derive second output signals commensurate with the disparity between the simulated position and the position of the perspective point of the recorded information along two orthogonal axes, and means for controlling said visual system in accordance with said second output signals, the improvement therewith comprising means for sensing one of said second output signals and for producing an error signal proportional thereto, and means for adding said error signal to said signals generated by the actuation of the simulator controls at the input of said integrating means.

2. A control system for maintaining the computed position of a vehicle simulator, responsive to quantities representing operator manipulation of the controls thereof and simulated forces acting thereon, within the lateral limits of a motion picture visual system having perspective transformation means, likewise responsive to operator manipulation of the simulator controls, said system comprising:
   a. means for developing first electrical signals commensurate with the computed position of the simulator;
   b. means for developing second electrical signals, commensurate with the perspective point from which said motion picture was taken;
   c. means for comparing said first and second signals and developing third signals commensurate with any discrepancy therebetween; and
   d. means for adding a component commensurate with said third signals as an input to said computed position, thereby maintaining the latter within the visual system boundaries.

3. The invention according to claim 2 wherein the simulator position is computed by means adapted to integrate the quantities representing control manipulation and simulated forces, and said third signals are supplied as an input to said integrating means.

4. In vehicle simulator wherein simulator position is computed from quantities representing operator control manipulation and simulated forces acting on the vehicle, said simulator having an attached visual system capable of limited lateral motion and where in actual visual system lateral position is controlled by developing and applying to the visual system a signal equal to the difference between the computed lateral position and a nominal visual system lateral position, means to maintain the simulator position within the limits of visual system lateral motion comprising:
   a. means to pick up the lateral signal applied to the visual system and to develop and apply a portion of said signal as an additional quantity to be used in the simulator for computing position whereby as the simulator position moves away from the nominal visual system lateral position a signal will be developed which will tend to keep said simulator position within the limits of said visual system lateral position.

5. The invention according to claim 4 wherein said visual system is a motion picture system with perspective transformation means responsive to the difference between the simulator lateral position and the nominal visual system lateral position, said nominal position being the lateral position at which said motion picture was taken.

6. The invention according to claim 4 wherein the simulator position is computed by integrating forces and velocities and wherein the signal developed by said means is provided to the simulator as a simulated force or velocity.

7. The invention according to claim 6 wherein the signal developed by said means is provided to the simulator as a simulated wind velocity.

UNITED STATES PATENT OFFICE
CERTIFICATE OF CORRECTION

Patent No. 3,591,933                    Dated July 13, 1971

Inventor(s)   William C. Ebeling

It is certified that error appears in the above-identified patent and that said Letters Patent are hereby corrected as shown below:

Column 4, line 4, the equation reading $f, (d) = \Delta V_g, \Delta \Psi_g$ should read $f_1(d) = f(\Delta V_g, \Delta \Psi_g)$ Column 4, line 13, the equation reading $F\ x, y = f_2(V_g, \Psi_g) + f_2(\alpha V_g, \alpha \Psi_g)$   should read $F\ x, y = f_2(V_g \Psi_g) = f_2(\Delta V_g, \Delta \Psi_g);$ Column 4, line 18, the equation reading $X, Y = f(V_g, \Psi_g) + f(\alpha V_g, \alpha \Psi_g)$ should read $X, Y = f(V_g, \Psi_g) + f(\Delta V_g, \Delta \Psi_g).$ Signed and sealed this 10th day of October 1972.

(SEAL)
Attest:

EDWARD M. FLETCHER, JR.                ROBERT GOTTSCHALK
Attesting Officer                      Commissioner of Patents